(12) United States Patent
Eberle et al.

(10) Patent No.: US 10,808,632 B2
(45) Date of Patent: Oct. 20, 2020

(54) METHOD FOR OBTAINING INFORMATION FOR ADJUSTING AN ADJUSTABLE COMPONENT OF A COMBUSTION ENGINE DRIVE SYSTEM OF A GARDENING AND/OR FORESTRY APPARATUS, GARDENING AND/OR FORESTRY APPARATUS SYSTEM, AND GARDENING AND/OR FORESTRY APPARATUS

(71) Applicant: Andreas Stihl AG & Co. KG, Waiblingen (DE)

(72) Inventors: Christian Eberle, Korb (DE); Florian Hoche, Besigheim (DE); Stephan Meyer, Waiblingen (DE); Claus Naegele, Stuttgart (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/026,872

(22) Filed: Jul. 3, 2018

(65) Prior Publication Data

US 2019/0010880 A1    Jan. 10, 2019

(30) Foreign Application Priority Data

Jul. 4, 2017    (EP) ..................... 17179676

(51) Int. Cl.
*F02B 63/02*     (2006.01)
*F02D 41/30*     (2006.01)
(Continued)

(52) U.S. Cl.
CPC ............. *F02D 35/00* (2013.01); *A01G 3/086* (2013.01); *F02B 63/02* (2013.01);
(Continued)

(58) Field of Classification Search
CPC .. F02D 35/00; F02D 35/0046; F02D 35/0053; F02D 33/006; F02D 41/3005;
(Continued)

(56) References Cited

U.S. PATENT DOCUMENTS

| 6,479,964 B2 * | 11/2002 | Woodroffe | ............. F02B 63/04 310/36 |
| 2005/0124234 A1 * | 6/2005 | Sells | ..................... B63H 21/24 440/33 |

(Continued)

FOREIGN PATENT DOCUMENTS

| DE | 42 15 733 A1 | 11/1993 |
| DE | 10 2011 079 293 A1 | 1/2013 |

(Continued)

*Primary Examiner* — George C Jin
(74) *Attorney, Agent, or Firm* — Crowell & Moring LLP

(57) ABSTRACT

A method obtains information for adjusting an adjustable component of a combustion engine drive system of a gardening and/or forestry apparatus. The method includes the steps of: providing a characteristic parameter using a mobile provision device, wherein the characteristic parameter describes a characteristic of an environment of the gardening and/or forestry apparatus; and obtaining the information for adjusting the adjustable component as a function of the provided characteristic parameter.

14 Claims, 1 Drawing Sheet

(51) Int. Cl.
F02D 35/00 (2006.01)
A01G 3/08 (2006.01)
F02N 11/08 (2006.01)
F02M 7/20 (2006.01)
F02M 7/22 (2006.01)

(52) U.S. Cl.
CPC .......... *F02D 41/3005* (2013.01); *F02M 7/20* (2013.01); *F02M 7/22* (2013.01); *F02N 11/0837* (2013.01); *F02N 2300/306* (2013.01)

(58) Field of Classification Search
CPC .... F02D 41/062; F02D 41/3076; F02B 63/02; F02B 63/04; F02B 63/044; F02B 63/047; F02B 63/048; F02M 7/20; F02M 7/22; F02N 2300/306; F02N 2300/302; F02N 11/0837; G06Q 10/06; G05C 5/0816; G05C 5/008; G08C 17/00; G08C 17/02
See application file for complete search history.

(56) References Cited

U.S. PATENT DOCUMENTS

| | | | |
|---|---|---|---|
| 2007/0018846 A1* | 1/2007 | Taraian | G08C 17/02 340/3.9 |
| 2009/0037040 A1* | 2/2009 | Salmon | B63H 21/21 701/21 |
| 2009/0146846 A1* | 6/2009 | Grossman | G06F 3/0488 340/988 |
| 2012/0110985 A1 | 5/2012 | McCombs et al. | |
| 2014/0297067 A1* | 10/2014 | Malay | G01C 9/005 701/4 |
| 2015/0042247 A1 | 2/2015 | Kusakawa | |
| 2015/0136433 A1 | 5/2015 | Nitsche et al. | |
| 2015/0225188 A1* | 8/2015 | Belluk | B65G 69/00 700/230 |
| 2015/0283879 A1* | 10/2015 | Tjandra | B60H 1/00778 165/202 |
| 2016/0342142 A1 | 11/2016 | Boeck et al. | |
| 2017/0080919 A1* | 3/2017 | Follen | B60W 20/12 |
| 2017/0120438 A1 | 5/2017 | Kynast | |
| 2017/0285632 A1* | 10/2017 | Bostick | G08G 5/0026 |
| 2018/0010566 A1* | 1/2018 | Barassi | F02N 11/0807 |
| 2018/0038993 A1* | 2/2018 | Jagenstedt | G01W 1/02 |
| 2018/0128231 A1* | 5/2018 | Chu | G08G 1/0133 |

FOREIGN PATENT DOCUMENTS

| | | |
|---|---|---|
| DE | 10 2012 208 913 A1 | 11/2013 |
| DE | 10 2013 215 148 A1 | 2/2015 |
| DE | 10 2014 011 643 A1 | 2/2015 |
| DE | 10 2014 209 032 A1 | 7/2015 |
| DE | 10 2014 206 289 A1 | 10/2015 |
| EP | 2 218 533 A1 | 8/2010 |
| WO | WO 2013/134709 A1 | 9/2013 |

* cited by examiner

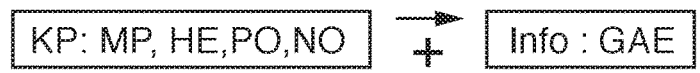
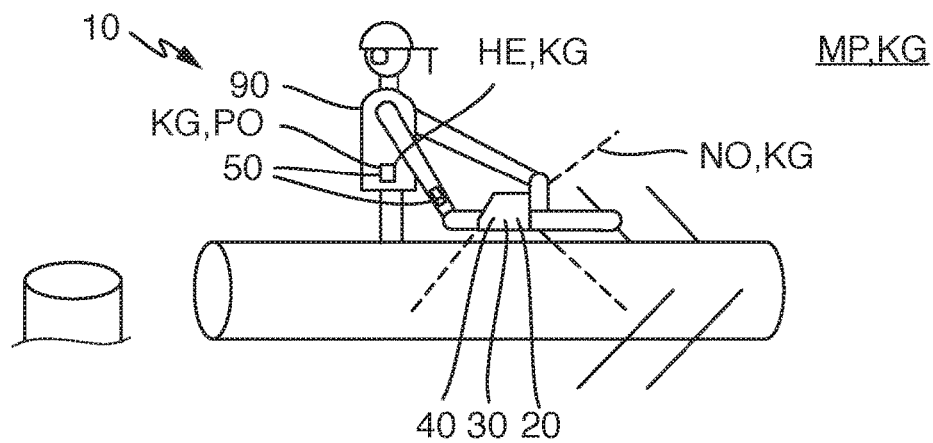
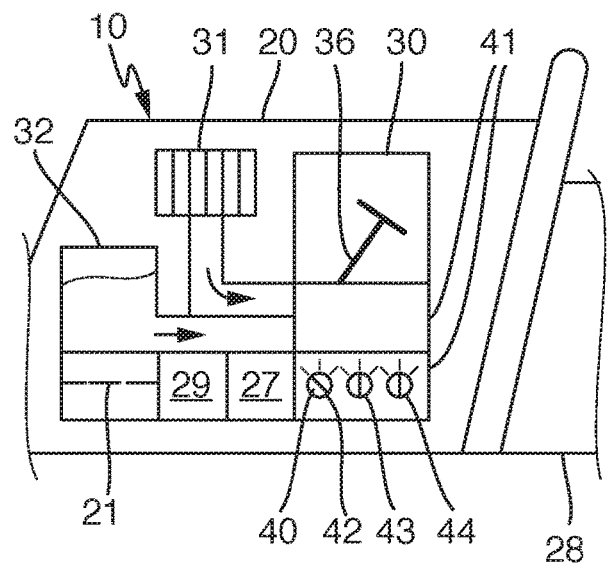
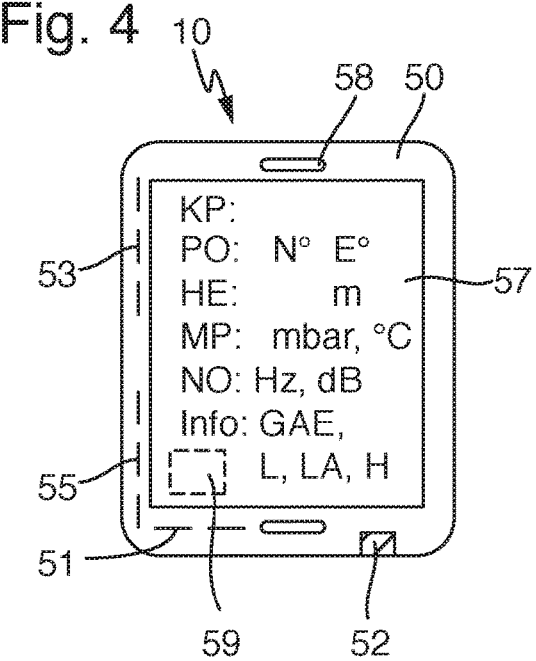

METHOD FOR OBTAINING INFORMATION FOR ADJUSTING AN ADJUSTABLE COMPONENT OF A COMBUSTION ENGINE DRIVE SYSTEM OF A GARDENING AND/OR FORESTRY APPARATUS, GARDENING AND/OR FORESTRY APPARATUS SYSTEM, AND GARDENING AND/OR FORESTRY APPARATUS

CROSS REFERENCE TO RELATED APPLICATION

This application claims priority under 35 U.S.C. § 119 from European Patent Application No. EP 17179676.6, filed Jul. 4, 2017, the entire disclosure of which is herein expressly incorporated by reference.

BACKGROUND AND SUMMARY OF THE INVENTION

The invention relates to a method for obtaining information for adjusting an adjustable component of a combustion engine drive system of a gardening and/or forestry apparatus, to a gardening and/or forestry apparatus system and to a gardening and/or forestry apparatus.

A method for adjusting an adjustable component of a combustion engine drive system of a gardening and/or forestry apparatus, a gardening and/or forestry apparatus system and a gardening and/or forestry apparatus are known.

The invention is based on the problem of providing a method for obtaining information for adjusting an adjustable component of a combustion engine drive system of a gardening and/or forestry apparatus, which method exhibits improved properties, in particular more functionalities, and/or which method is user-friendly. The invention is further based on the problem of providing a gardening and/or forestry apparatus system and a gardening and/or forestry apparatus.

The invention solves this problem by providing a method for obtaining information for adjusting an adjustable component of a combustion engine drive system of a gardening and/or forestry apparatus, a gardening and/or forestry apparatus system and a gardening and/or forestry apparatus, in accordance with claimed embodiments of the invention. Advantageous developments and/or refinements of the invention are described and claimed herein.

The, in particular automatic, method according to the invention for obtaining information for adjusting an adjustable component of a combustion engine drive system of a gardening and/or forestry apparatus comprises the steps: a) providing, in particular automatically providing, in particular at least, a characteristic parameter using a mobile or portable provision device, wherein the characteristic parameter describes a characteristic of an environment of the gardening and/or forestry apparatus; and b) obtaining the information for adjusting the adjustable component as a function of the provided characteristic parameter.

The method allows for optimum adjustment of the adjustable component of the combustion engine drive system of the gardening and/or forestry apparatus. Therefore, the method allows for optimum starting and/or optimum operation of the combustion engine drive system. The mobile provision device allows for user-friendly handling.

The environment can include or be ambient air of the gardening and/or forestry apparatus.

Starting and/or operation of the combustion engine drive system can be a function of or at least be influenced by an adjustment of the adjustable component and/or of the environment or its characteristic. Adjustment of the component can allow for adaptation of the combustion engine drive system to the environment.

The information can include, or be, the adjustment of the adjustable component, in particular a starting adjustment for starting the combustion engine drive system.

The mobile provision device can be configured separately from the component, in particular from the combustion engine drive system, in particular from the gardening and/or forestry apparatus. In other words: the mobile provision device may or does not need to be a constituent part of the component, in particular not a constituent part of the combustion engine drive system, in particular not a constituent part of the gardening and/or forestry apparatus. The mobile provision apparatus can be hand-held. The information can be obtained using the mobile provision device or the said mobile provision device can be configured for this purpose.

The gardening and/or forestry apparatus can be configured as a hand-guided gardening and/or forestry apparatus, in particular as a hand-held gardening and/or forestry apparatus or a floor-guided gardening and/or forestry apparatus. Hand-guided, in particular hand-held, gardening and/or forestry apparatus can mean that the gardening and/or forestry apparatus can have a maximum weight of 50 kilograms (kg), in particular of 20 kg, in particular of 10 kg.

The characteristic parameter can include or be a value and/or a magnitude of the characteristic. In addition, the adjustment can include or be a value and/or a magnitude.

The adjustable component or its adjustment can include at least two, in particular at least three, different values. In particular, the adjustable component or its adjustment or the value of the said adjustment can be progressive or continuous. In addition or as an alternative, the characteristic or its characteristic parameter or the value of the said characteristic parameter can change, in particular continuously. The adjustable component or its adjustment or the value of the said adjustment can be changed particularly when there is a change in the environment or its characteristic or its characteristic parameter or the value of the said characteristic parameter. In addition or as an alternative, the adjustable component or its adjustment or the value of the said adjustment do not need to be changed or can be left unchanged when there is no change in the environment or its characteristic or its characteristic parameter or the value of the said characteristic parameter.

The step b) can be executed at the same time as the step a) and/or after the said step a).

In addition, the method can comprise the step: providing, in particular automatically providing, operating data of the gardening and/or forestry apparatus or its combustion engine drive system or its adjustable component, in particular using the mobile provision device. The step b) can include: obtaining, in particular automatically obtaining, the information for adjusting the adjustable component as a function of the provided operating data.

Starting and/or operation of the combustion engine drive system can be a function of or at least be influenced by an adjustment of the adjustable component and/or of the operating data.

In particular, the operating data can be a, in particular actual or current or momentary, temperature of the gardening and/or forestry apparatus or its combustion engine drive system or its adjustable component. In addition or as an alternative, the operating data can be an on period of the gardening and/or forestry appliance or its combustion engine drive system or its adjustable component of a, in particular last, operation and/or an off period since a, in particular the, last operation. In particular, the temperature can be a function of or at least influenced by the on period and/or the off period. Further in addition or as an alternative, the operating data can include or be a value and/or a magnitude. Further in addition or as an alternative, the operating data of the gardening and/or forestry appliance can be referred to as appliance operating data.

In one development of the invention, the method comprises the step: outputting, in particular automatically outputting, and/or transmitting, in particular automatically transmitting, the obtained information. The step can be executed at the same time as the step b) or after the step b). The outputting allows for a gardener and/or forestry worker or a user of the gardening and/or forestry apparatus to adjust the adjustable component. In particular, the obtained information can be output by the mobile provision device or the said mobile provision device can be configured for this purpose. The transmission can be performed by the mobile provision device or the said mobile provision device can be configured for this purpose. The said transmission can be referred to as sending. The transmission can be performed at the gardening and/or forestry apparatus or the said gardening and/or forestry apparatus can be configured for this purpose. The said transmission can be referred to as reception. In particular, the transmission can be performed in a cable-free or wire-free manner. The transmission can allow for the gardening and/or forestry apparatus to adjust the adjustable component.

In one refinement of the invention, the information is output using optics, acoustics and/or haptics. The said outputting can allow for relatively good perception of the information by the gardener and/or forestry worker. In particular, optical output can include display. Optical output can include superimposition or projection of the information into a field of view of the gardener and/or forestry worker. Haptic output can include vibration.

In one development of the invention, the method comprises the step: transmitting, in particular automatically transmitting, the provided characteristic parameter. The step b) includes: obtaining the information for adjusting the adjustable component as a function of the transmitted characteristic parameter. The transmission can be performed by the mobile provision device. The transmission can be performed to the gardening and/or forestry apparatus. In particular, the transmission can be performed in a cable-free or wire-free manner. The information can be obtained using the gardening and/or forestry apparatus or the said gardening and/or forestry apparatus can be configured for this purpose.

In one development of the invention, the method comprises the step: adjusting, in particular automatically adjusting, the adjustable component based on the obtained information. The adjustment can be performed using the gardening and/or forestry apparatus or its combustion engine drive system itself or said gardening and/or forestry apparatus can be configured for this purpose.

In one development of the invention, the step a) includes: receiving, in particular receiving in a cable-free or wire-free manner, or calling up the characteristic parameter, in particular from a database and/or a network, in particular from the Internet. In other words: the mobile provision device can include a receiver unit which can be configured to receive the characteristic parameter. The receiver unit can include a mobile radio receiver unit, in particular a UMTS receiver unit, or a receiver unit which is based on another technology.

In addition or as an alternative, the operating data can be received, in particular in a cable-free or wire-free manner, in particular by the gardening and/or forestry apparatus or its combustion engine drive system or its adjustable component. In particular, the mobile provision device can include a receiver unit which can be configured to receive the operating data. The receiver unit can include a local receiver unit, in particular a WLAN and/or Bluetooth receiver unit, or a receiver unit which is based on another technology.

In one development of the invention, the mobile provision device includes, in particular, a sensor. The step a) includes: identifying the characteristic using the sensor. In particular, the sensor can be disposed in a spatially separated or remote manner from the adjustable component, in particular from the combustion engine drive system, in particular from the gardening and/or forestry apparatus, in this case.

In addition or as an alternative, the mobile provision device can include a, in particular the, sensor. The operating data can be identified using the sensor. In particular, the sensor can be disposed in a spatially separated or remote manner from the adjustable component, in particular from the combustion engine drive system, in particular from the gardening and/or forestry apparatus, in this case.

In one development of the invention, the characteristic includes: a meteorological characteristic, a height, a position and/or a noise generated by an operation of the combustion engine drive system. In particular, the meteorological characteristic can include an air temperature, an air humidity, a dew point, an air pressure, an air density, an air composition, a wind direction, a wind speed, a type of precipitation, an amount of precipitation and/or a season. In particular, the air temperature, the air humidity, the dew point, the air pressure, the air density, the air composition, the wind direction, the wind speed, the type of precipitation and/or the amount of precipitation can be a function of, or at least be influenced by, the season. The adjustment of the adjustable component or starting and/or operation of the combustion engine drive system can be a function of, or at least be influenced by, the meteorological characteristic. The above-described sensor can be configured to identify the meteorological characteristic and/or its parameter or value. The sensor can include a thermometer, a hygrometer, a dew point mirror hygrometer, a barometer and/or a precipitation gauge. The height can be, in particular, the height above sea level. The height can be used to provide or obtain, in particular receive, the meteorological characteristic or its parameter for this height. The above-described sensor can be configured to identify the height and/or its parameter or value. The sensor can include an altimeter. In particular, the position can be used to provide or obtain, in particular receive, the meteorological characteristic or its parameter for this position. In addition or as an alternative, the position can be used to provide or obtain, in particular receive, the height or its parameter for this position. The above-described sensor can be configured to identify the position and/or its parameter or value. The sensor can include a position determination sensor, in particular a satellite position determination receiver. In particular, the noise can be a function of or at least be influenced by an actual adjustment of the adjustable component. A characteristic parameter of the noise can include or be a noise frequency and/or a noise intensity. The above-described sensor can be configured to identify the noise and/or its parameter or value. The sensor can include a noise transducer, in particular a microphone.

In addition or as an alternative, the above-described sensor can be configured to identify a, in particular the, noise generated by an, in particular the, operation of the combustion engine drive system and/or its parameter or value for identifying the operating data, in particular the on period and/or the off period. In particular, the sensor can include a, in particular the, noise transducer, in particular a, in particular the, microphone.

In one development of the invention, the adjustable component includes a mixture preparation device or is a mixture preparation device. The information includes a mixture preparation adjustment or is a mixture preparation adjustment. In particular, the mixture preparation adjustment can be a function of or at least be influenced by the environment, in particular the ambient air, for example its meteorological characteristic. Adjustment of the mixture preparation device can allow for adaptation of the combustion engine drive system to the environment. The mixture preparation adjustment can include or be a value and/or a magnitude. In particular, the mixture preparation device can include a carburetor and the mixture preparation adjustment can include a carburetor adjustment. In addition or as an alternative, the mixture preparation device can include a fuel inlet valve, in particular a fuel injection valve, and the mixture preparation adjustment can include a fuel inlet valve adjustment. Further in addition or as an alternative, the mixture preparation device can include an engine control device, and the mixture preparation adjustment can include an engine control adjustment.

In one development of the invention, the gardening and/or forestry apparatus includes a saw, a pole pruner, a clearing saw, a brush cutter, hedge shears, a hedge cutter, a blower device, a leaf blower, a sweeper device, a sweeper roller, a sweeper brush, a lawn mower and/or dethatcher or is a specific gardening and/or forestry apparatus of this kind. In particular, the saw, the pole pruner, the clearing saw, the brush cutter, the hedge shears, the hedge cutter, the blower device or the leaf blower can each be referred to as a hand-held gardening and/or forestry apparatus. In particular, the sweeper device, the sweeper roller, the sweeper brush, the lawnmower or the dethatcher can each be referred to as a floor-guided gardening and/or forestry device.

The invention further relates to a gardening and/or forestry apparatus system which can be configured, in particular, to execute the above-described method. The gardening and/or forestry apparatus system according to the invention includes the mobile provision device which is configured to provide the characteristic parameter, wherein the characteristic parameter describes the characteristic of the environment of the gardening and/or forestry apparatus. The gardening and/or forestry apparatus includes the combustion engine drive system which has the adjustable component. Furthermore, the gardening and/or forestry apparatus system is configured to obtain information for adjusting the adjustable component as a function of the provided characteristic parameter.

The gardening and/or forestry apparatus system can allow for the same advantages as the above-described method.

In particular, the gardening and/or forestry apparatus system can include an obtaining device which can be configured to obtain the information. The obtaining device can include a computer and/or memory unit. In particular, the mobile provision device can include the obtaining device.

The gardening and/or forestry system can include an output device which can be configured to output the obtained information. The output device can include a display, a noise generator and/or a vibration device. In particular, the mobile provision device can include the output device. In addition or as an alternative, the display can be configured to display the information in the field of view of the gardener and/or forestry worker and/or to project or superimpose the said information in the said field of view. The display can be referred to as a head-up display. This can be referred to as virtual reality and/or augmented reality. In particular, the display can be configured to be disposed in the region or even on the head of the gardener and/or forestry worker. The display can be referred to as a head-mounted display.

In addition, the gardening and/or forestry apparatus system can be configured to provide operating data of the gardening and/or forestry apparatus or its combustion engine drive system or its adjustable component and to obtain the information for adjusting the adjustable component as a function of the provided operating data.

In one development of the invention, the mobile provision device includes a smartphone and/or a smartwatch or is a smartphone or a smartwatch.

In one development of the invention, the gardening and/or forestry apparatus system includes the gardening and/or forestry apparatus.

In one refinement of the invention, the mobile provision device includes a provision transmission unit, in particular a provision sender unit. The gardening and/or forestry apparatus includes a gardening and/or forestry transmission unit, in particular a gardening and/or forestry receiver unit. The provision transmission unit and the gardening and/or forestry transmission unit are configured to interact with one another and to transmit the provided characteristic parameter and/or to transmit the obtained information. In particular, the provision transmission unit can include a local radio provision transmission unit, in particular a WLAN and/or Bluetooth provision transmission unit, or a provision transmission unit which is based on another technology. The gardening and/or forestry transmission unit can include a local radio gardening and/or forestry transmission unit, in particular a WLAN and/or Bluetooth gardening and/or forestry transmission unit, or a gardening and/or forestry transmission unit which is based on another technology. In particular, the gardening and/or forestry apparatus can include the obtaining device. In addition or as an alternative, the gardening and/or forestry apparatus can include the output device. Further in addition or as an alternative, the gardening and/or forestry apparatus or its combustion engine drive system can include an adjustment device which can be configured to adjust the adjustable component based on the obtained information. In particular, the gardening and/or forestry transmission unit, the obtaining device, if present in the gardening and/or forestry apparatus, the output device, if present in the gardening and/or forestry apparatus, and/or the adjustment device, if present, can be functional after actuation and/or during operation of the combustion engine drive system, in particular only at this time. In addition, the provision transmission unit and the gardening and/or forestry transmission unit can be configured to transmit the provided operating data.

The invention also relates to the gardening and/or forestry apparatus. The gardening and/or forestry apparatus according to the invention includes the combustion engine drive system which has the adjustable component, and the gardening and/or forestry transmission unit. The gardening and/or forestry transmission unit is configured to transmit the information for adjusting the adjustable component. In addition or as an alternative, the gardening and/or forestry transmission unit is configured to transmit the characteristic parameter, wherein the characteristic parameter describes the characteristic of the environment of the gardening and/or forestry apparatus. At least in this case, the gardening and/or forestry apparatus is configured to obtain the information for adjusting the adjustable component as a function of the characteristic parameter.

The gardening and/or forestry apparatus can allow for the same advantages as the above-described method and/or as the above-described gardening and/or forestry apparatus system.

In particular, the gardening and/or forestry apparatus can include the output device. In addition or as an alternative, the gardening and/or forestry apparatus or its combustion engine drive system can include an adjustment device which can be configured to adjust the adjustable component based on the obtained information. Further in addition or as an alternative, the gardening and/or forestry transmission unit can be configured to transmit the operating data, and the gardening and/or forestry apparatus can be configured to obtain the information for adjusting the adjustable component as a function of the operating data.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a flowchart of an exemplary method according to the invention.

FIG. 2 is a perspective view of a gardening and/or forestry apparatus system according to an embodiment of the invention comprising at least one mobile provision device and comprising a gardening and/or forestry apparatus during operation.

FIG. 3 is a view of a longitudinal section through the gardening and/or forestry apparatus of FIG. 2.

FIG. 4 is a front view of the mobile provision device of FIG. 2.

DETAILED DESCRIPTION OF THE DRAWINGS

FIGS. 2 to 4 show a gardening and/or forestry apparatus system 10 according to the invention. The gardening and/or forestry apparatus system 10 includes a mobile provision device 50. The mobile provision device 50 is configured to provide a characteristic parameter KP or its value. The characteristic parameter KP or its value describes a characteristic KG of an environment 100 of a gardening and/or forestry apparatus 20. The gardening and/or forestry apparatus 20 includes a combustion engine drive system 30 which has an adjustable component 40. The gardening and/or forestry apparatus system 10 is configured to obtain information Info for adjusting the adjustable component 40 as a function of the provided characteristic parameter KP.

In the exemplary embodiment shown, the gardening and/or forestry apparatus system 10 includes at least one obtaining device 29, 59 which is configured to obtain the information Info. Specifically, the obtaining device includes a computer and/or memory unit, not illustrated. In the exemplary embodiment shown, the gardening and/or forestry apparatus system 10 includes two obtaining devices 29, 59. The mobile provision device 50 includes one obtaining device 59. The gardening and/or forestry apparatus 20 includes the other obtaining device 29. In alternative exemplary embodiments, it may be sufficient when either the mobile provision device or the gardening and/or forestry apparatus can include the obtaining device.

Furthermore, the gardening and/or forestry apparatus system 10 includes at least one output device 57, 58 which is configured to output the obtained information Info. In the exemplary embodiment shown, the mobile provision device 50 includes the output device 57, 58. In alternative exemplary embodiments, the gardening and/or forestry apparatus can, in addition or as an alternative, include the output device.

In the exemplary embodiment shown, the gardening and/or forestry apparatus system 10 also includes two mobile provision devices 50. One mobile provision device 50 includes a smartphone which is disposed in a pocket of a gardener and/or forestry worker 90 in FIG. 2. The other mobile provision device 50 includes a smartwatch which is disposed on the right arm of the gardener and/or forestry worker 90 in FIG. 2. In alternative exemplary embodiments, it may be sufficient when the gardening and/or forestry apparatus system can include only one single mobile provision device.

The gardening and/or forestry apparatus system 10 further includes the gardening and/or forestry apparatus 20.

FIG. 1 shows a method according to the invention for obtaining the information Info for adjusting the adjustable component 40 of the combustion engine drive system 30 of the gardening and/or forestry apparatus 20, in particular using the above-described gardening and/or forestry apparatus system 10. The method comprises the steps: a) providing the characteristic parameter KP using the mobile provision device 50, wherein the characteristic parameter KP describes the characteristic of the environment 100 of the gardening and/or forestry apparatus 20; and b) obtaining the information Info for adjusting the adjustable component 40 as a function of the provided characteristic parameter KP, in particular using the obtaining device 29, 59.

In addition, the gardening and/or forestry apparatus 20 includes a saw. In alternative exemplary embodiments, the gardening and/or forestry apparatus can, in addition or as an alternative, include a pole pruner, a clearing saw, a brush cutter, hedge shears, a hedge cutter, a blower device, a leaf blower, a sweeper device, a sweeper roller, a sweeper brush, a lawn mower and/or a dethatcher. The gardening and/or forestry apparatus 20 includes a gardening and/or forestry tool 28 in the form of a saw chain. The combustion engine drive system 30 is configured to drive the gardening and/or forestry tool 28.

Specifically, the component 40 includes a mixture preparation device 41. The information Info includes a mixture preparation adjustment GAE or its value, in particular a starting adjustment for starting the combustion engine drive system 30.

In the exemplary embodiment shown, the mixture preparation device 41 includes a carburetor and the mixture preparation adjustment GAE includes a carburetor adjustment. In alternative exemplary embodiments, the mixture preparation device can, in addition or as an alternative, include a fuel inlet valve, in particular a fuel injection valve, and the mixture preparation adjustment can include a fuel inlet valve adjustment. In alternative exemplary embodiments, in addition or as an alternative, the mixture preparation device can further include an engine control device, and the mixture preparation adjustment can include an engine control adjustment. Specifically, the carburetor has a user-adjustable L screw 42 for an air nozzle, as can be seen in FIG. 3. An adjustment of the L screw 42 affects an air/fuel mixture of the combustion engine drive system 30. Air can be supplied to the mixture preparation device 41 from an air supply 31. Fuel can be supplied to the mixture preparation device 41 from a fuel tank 32. Furthermore, the carburetor has a user-adjustable LA screw 43 for an idling stop. An adjustment of the LA screw 43 affects an idling rotation speed of the combustion engine drive system 30. In addition, the carburetor includes a user-adjustable H screw 44 for a main nozzle. An adjustment of the H screw 44 affects a maximum rotation speed of the combustion engine drive system 30.

Starting and/or operation of the combustion engine drive system 30 is a function of the adjustment of the adjustable component 40 and of the environment 100, in particular the ambient air, or its characteristic KG.

Specifically, the characteristic KG includes a meteorological characteristic MP, a height HE, a position PO and a noise NO generated by the operation of the combustion engine drive system 30, as indicated in FIG. 3. In alternative exemplary embodiments, it may be sufficient when the characteristic can include either the meteorological characteristic or the height or the position or the noise. In the exemplary embodiment shown, the meteorological characteristic MP includes an air temperature, an air humidity, a dew point, an air pressure, an air density, an air composition, a wind direction, a wind speed, a type of precipitation, an amount of precipitation and a season. In alternative exemplary embodiments, it may be sufficient when the meteorological characteristic can include only some of these specific meteorological characteristics. Furthermore, in the exemplary embodiment shown, the height HE is the height above sea level. In addition, the noise NO is a function of or at least influenced by an actual adjustment of the adjustable component 40.

The mobile provision device 50 includes a sensor 51, 52. The step a) includes: identifying the characteristic KG using the sensor 51, 52.

In the exemplary embodiment shown, the mobile provision device 50 includes two sensors 51, 52. The sensor 51 is configured as a position determination sensor, in particular as a satellite position determination receiver. The sensor 52 is configured as a microphone. In alternative exemplary embodiments, the mobile provision device can include some of the above-described sensors. In alternative exemplary embodiments, the mobile provision device can further, in addition or as an alternative, include other sensors. The position PO is identified using the sensor 51. The noise is identified using the sensor 52.

Furthermore, the mobile provision device 50 includes a receiver unit 53. The receiver unit 53 is configured as a mobile radio antenna.

The step a) also includes: receiving the characteristic parameter KP, in particular from a database and/or a network, in particular using the receiver unit 53.

In the exemplary embodiment shown, the height HE or its parameter for the identified position PO is received. Furthermore, the meteorological characteristic MP or its parameter for the identified position PO is received.

The method further comprises the step: outputting the obtained information Info, in particular using the output device 57, 58.

Specifically, the output device includes a display 57 in the form of a touchscreen, a noise generator 58 in the form of a loudspeaker and a vibration device, not illustrated. In alternative exemplary embodiments, it may be sufficient when the output device can include either the display or the noise generator or the vibration device.

Accordingly, the information Info is output using optics, acoustics and/or haptics.

The obtained information or its mixture preparation adjustment GAE is a function of the environment 100 or its characteristic KG, in particular of its value. In a first exemplary situation, the gardening and/or forestry apparatus 20 is at a great height. The season is winter. The air pressure is relatively low. The air temperature is relatively low. For this first situation, the mixture preparation adjustment GAE, in particular for starting the combustion engine drive system 30, will be a cold starting adjustment. In a second exemplary situation, the gardening and/or forestry apparatus 20 is at sea level. The season is summer. The air pressure is relatively high. The air temperature is relatively high. For this second situation, the mixture preparation adjustment GAE, in particular for starting the combustion engine drive system 30, will be a warm starting adjustment. After starting of the combustion engine drive system 30, the noise NO generated by the operation of said combustion engine drive system can be identified. The noise NO can be a function of or at least influenced by an actual adjustment of the adjustable component 40. If the adjustment of the adjustable component 40 is not optimal, an optimum adjustment can be obtained and output.

Therefore, the gardener and/or forestry worker 90 can adjust the adjustable component 40 based on the obtained and output information Info.

In the exemplary embodiment shown, the mobile provision device 50 additionally has a provision transmission unit 55, in particular a provision sender unit. The provision transmission unit 55 is configured as a local radio antenna. The gardening and/or forestry apparatus 20 has a gardening and/or forestry transmission unit 21, in particular a gardening and/or forestry receiver unit. The gardening and/or forestry transmission unit 21 is configured as a local radio antenna. The provision transmission unit 55 and the gardening and/or forestry transmission unit 21 are configured to interact with one another and to transmit the provided characteristic parameter KP.

In addition, the gardening and/or forestry apparatus 20 includes the obtaining device 29, as described above.

The method comprises the step: transmitting the provided characteristic parameter KP, in particular from the mobile provision device 50 to the gardening and/or forestry apparatus 20. The step b) includes: obtaining the information Info for adjusting the adjustable component 40 as a function of the transmitted characteristic parameter KP, in particular using the obtaining device 29.

In addition, the gardening and/or forestry apparatus 20 or its combustion engine drive system 30 includes an adjustment device 27 which is configured to automatically adjust the adjustable component 40 based on the obtained information Info. In the exemplary embodiment shown, the obtaining device 29 and the adjustment device 27 are configured to interact with one another. Furthermore, the adjustment device 27 is configured to adjust the mixture preparation device 41, in particular the L screw 42, the LA screw 43 and the H screw 44.

Furthermore, the method comprises the step: adjusting the adjustable component 40 based on the obtained information Info, in particular using the adjustment device 27.

In the exemplary embodiment shown, the gardening and/or forestry transmission unit 21, the obtaining device 29 and the adjustment device 27 are functional only after actuation or during operation of the combustion engine drive system 30. The gardening and/or forestry apparatus does not need to include a battery for supplying power to the gardening and/or forestry transmission unit, the obtaining device and the adjustment device. In particular, the combustion engine drive system 30 includes an actuating handle 36, in particular a pull grip, for actuating, in particular for pulling, the combustion engine drive system 30. The pulling operation can supply power to the gardening and/or forestry transmission unit, the obtaining device and the adjustment device.

In alternative exemplary embodiments, the obtained information can be transmitted, in particular from the mobile provision device to the gardening and/or forestry apparatus. The gardening and/or forestry apparatus does not need to include the obtaining device. The adjustment device and the gardening and/or forestry transmission unit can be configured to interact with one another. In alternative exemplary embodiments, it may further be sufficient when either the mobile provision device can be configured to obtain the information and to output the information or the mobile provision device can be configured to transmit the said information to the gardening and/or forestry apparatus and the said garden gardening and/or forestry apparatus can be configured to adjust the adjustable component.

In alternative exemplary embodiments, the gardening and/or forestry apparatus system can, in addition or as an alternative, be configured to provide operating data of the gardening and/or forestry apparatus or its combustion engine drive system or its adjustable component and to obtain the information for adjusting the adjustable component as a function of the provided operating data.

The method can comprise the step: providing operating data of the gardening and/or forestry apparatus or its combustion engine drive system or its adjustable component, in particular using the gardening and/or forestry apparatus system. The step b) can include: obtaining the information for adjusting the adjustable component as a function of the provided operating data, in particular using the gardening and/or forestry apparatus system.

Starting and/or operation of the combustion engine drive system can be a function of an adjustment of the adjustable component and/or a function of the operating data.

In particular, the operating data can be a temperature of the gardening and/or forestry apparatus or its combustion engine drive system or its adjustable component. In addition or as an alternative, the operating data can be an on period of the gardening and/or forestry apparatus or its combustion engine drive system or its adjustable component of a, in particular last, operation and/or an off period since a, in particular the, last operation. In particular, the temperature can be a function of or at least influenced by the on period and/or the off period.

The obtained information or its mixture preparation adjustment can be a function of the operating data, in particular of its value. In the above-described first situation, the temperature can be lower than a limit temperature value and/or the on period can be shorter than a limit on period and/or the off period can be longer than a limit off period. In this case, the mixture preparation adjustment, in particular for starting the combustion engine drive system, can be a, in particular the, cold starting adjustment. As an alternative, in particular after first starting and/or first operation of the gardening and/or forestry apparatus or its combustion engine drive system or its adjustable component, the temperature can be higher than the limit temperature value and/or the on period can be longer than the limit on period and/or the off period can be shorter than the limit off period. In this case, the mixture preparation adjustment, in particular for starting the combustion engine drive system, can be a, in particular the, warm starting adjustment.

As is clear from the exemplary embodiments shown and explained above, the invention provides an advantageous method for obtaining information for adjusting an adjustable component of a combustion engine drive system of a gardening and/or forestry apparatus, which method exhibits improved properties, in particular more functionalities, and also a gardening and/or forestry apparatus system, and the gardening and/or forestry apparatus. In particular, the method, the gardening and/or forestry apparatus system and the gardening and/or forestry apparatus allow for optimum adjustment of the adjustable component of the combustion engine drive system of the gardening and/or forestry apparatus. This allows for optimum starting and/or optimum operation of the combustion engine drive system. The mobile provision device allows for user-friendly handling.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for obtaining information for adjusting an adjustable component of a combustion engine drive system of a gardening and/or forestry apparatus, the method comprising the steps of:
   a) providing a characteristic parameter using a mobile provision device, wherein the characteristic parameter describes a characteristic of an environment of the gardening and/or forestry apparatus;
   b) obtaining the information for adjusting the adjustable component as a function of the provided characteristic parameter; and
   c) outputting and/or transmitting the obtained information,
   wherein adjustment of the adjustable component allows for adaptation of the combustion engine drive system to the environment, and
   wherein the information includes the adjustment of the adjustable component.

2. The method according to claim 1, wherein
   the information is output using optics, acoustics and/or haptics.

3. The method according to claim 1, further comprising the step of:
   transmitting the provided characteristic parameter, wherein
   the step b) includes: obtaining the information for adjusting the adjustable component as a function of the transmitted characteristic parameter.

4. The method according to claim 1, further comprising the step of:
   adjusting the adjustable component based on the obtained information.

5. The method according to claim 1, wherein
   the step a) includes: receiving the characteristic parameter.

6. The method according to claim 1, wherein
   the mobile provision device includes a sensor, and
   the step a) includes: identifying the characteristic using the sensor.

7. The method according to claim 1, wherein the characteristic parameter comprises one or more of:
   a meteorological characteristic,
   a height,
   a position, or
   a noise generated by an operation of the combustion engine drive system.

8. The method according to claim 1, wherein
the adjustable component includes a mixture preparation device and the information includes a mixture preparation adjustment.

9. The method according to claim 1, wherein
the gardening and/or forestry apparatus includes a saw, a pole pruner, a clearing saw, a brush cutter, hedge shears, a hedge cutter, a blower device, a leaf blower, a sweeper device, a sweeper roller, a sweeper brush, a lawn mower and/or dethatcher.

10. A gardening and/or forestry apparatus system, comprising:
a mobile provision device configured to provide a characteristic parameter, wherein the characteristic parameter describes a characteristic of an environment of a gardening and/or forestry apparatus, wherein
the gardening and/or forestry apparatus includes a combustion engine drive system which has an adjustable component, and
the gardening and/or forestry apparatus system is configured to:
obtain information for adjusting the adjustable component as a function of the provided characteristic parameter; and
output and/or transmit the obtained information,
wherein adjustment of the adjustable component allows for adaptation of the combustion engine drive system to the environment, and
wherein the information includes the adjustment of the adjustable component.

11. The gardening and/or forestry apparatus system according to claim 10, wherein
the mobile provision device includes a smartphone and/or a smartwatch.

12. The gardening and/or forestry apparatus system according to claim 10, further comprising:
the gardening and/or forestry apparatus.

13. The gardening and/or forestry apparatus system according to claim 12, wherein
the mobile provision device includes a provision transmission unit, and
the gardening and/or forestry apparatus includes a gardening and/or forestry transmission unit,
wherein the provision transmission unit and the gardening and/or forestry transmission unit are configured to mutually cooperate and to transmit the provided characteristic parameter and/or to transmit the obtained information.

14. A gardening and/or forestry apparatus, comprising:
a combustion engine drive system which has an adjustable component,
a gardening and/or forestry transmission unit configured to transmit information for adjusting the adjustable component,
wherein the information for adjusting the adjustable component is obtained as a function of a characteristic parameter describing a characteristic of an environment of the gardening and/or forestry apparatus,
wherein adjustment of the adjustable component allows for adaptation of the combustion engine drive system to the environment, and
wherein the information includes the adjustment of the adjustable component.

* * * * *